United States Patent [19]

von Bonin et al.

[11] Patent Number: 5,397,643
[45] Date of Patent: Mar. 14, 1995

[54] LIGHTWEIGHT SHAPED ARTICLES CONTAINING EXPANDABLE GRAPHITE, THEIR PRODUCTION AND THEIR USE

[75] Inventors: Wulf von Bonin, Odenthal; Ulrich von Gizycki, Leverkusen, both of Germany

[73] Assignee: Bayer Aktiengesellschaft, Leverkusen, Germany

[21] Appl. No.: 33,445

[22] Filed: Mar. 18, 1993

Related U.S. Application Data

[63] Continuation of Ser. No. 678,100, Apr. 1, 1991, abandoned, which is a continuation-in-part of Ser. No. 504,360, Apr. 3, 1990, Pat. No. 5,053,148.

[30] Foreign Application Priority Data

Apr. 11, 1990 [DE] Germany .................. 40 11 697.2

[51] Int. Cl.⁶ .................. C04B 35/52; C04B 14/32
[52] U.S. Cl. .................. 428/408; 428/305.5; 423/448; 521/54; 521/55; 523/179
[58] Field of Search .................. 428/305.5, 408; 423/448; 521/54, 55; 523/179

[56] References Cited

U.S. PATENT DOCUMENTS

| | | | |
|---|---|---|---|
| 4,146,401 | 3/1979 | Yamada et al. | 106/56 |
| 4,432,408 | 2/1984 | Caines | 165/1 |
| 4,676,515 | 6/1987 | Cobb | 277/235 B |
| 4,694,030 | 9/1987 | Von Bonin et al. | 523/179 |
| 4,723,783 | 2/1988 | Belter et al. | 277/235 B |
| 4,892,783 | 1/1990 | Brazel | 428/408 |
| 4,973,516 | 11/1990 | Yamaoka et al. | 428/332 |
| 5,053,148 | 10/1991 | von Bonin | 252/8.05 |
| 5,094,780 | 3/1992 | Von Bonin | 428/408 |

FOREIGN PATENT DOCUMENTS

| | | |
|---|---|---|
| 0059866 | 9/1982 | European Pat. Off. |
| 0061636 | 10/1982 | European Pat. Off. |
| 0164984 | 12/1985 | European Pat. Off. |
| 3912552 | 10/1990 | Germany . |
| 2169273 | 7/1986 | United Kingdom . |

*Primary Examiner*—George F. Lesmes
*Assistant Examiner*—Blaine R. Copenheaver
*Attorney, Agent, or Firm*—William C. Gerstenzang

[57] ABSTRACT

Sandwich-like lightweight shaped articles consist of a core material containing expandable graphite expanded according to the mould and if appropriate a binder, and at least one covering layer of thermoplastic material.

1 Claim, No Drawings

LIGHTWEIGHT SHAPED ARTICLES CONTAINING EXPANDABLE GRAPHITE, THEIR PRODUCTION AND THEIR USE

This application is a continuation, of application Ser. No. 678,100, filed Apr. 4, 1991, now abandoned, which is a continuation-in-part of Ser. No. 07/504,360, filed Apr. 3, 1990, now U.S. Pat. No. 5,053,148, issued Oct. 1, 1991.

The present invention relates to sandwich-like lightweight shaped articles, the core material of which contains expanded expandable graphite, and a process for their production and their use.

Known sandwich-like lightweight shaped articles having a relatively high heat resistance contain as the core material, for example, foamed glass which has been joined to the covering layers by glueing. The disadvantage of these is that the heat resistance is not high enough for many purposes, and the production of specifically shaped lightweight articles is difficult.

Sandwich-like lightweight shaped articles have now been found, which are characterised in that their core material contains expandable graphite expanded according to the mould, and at least one covering layer consists of a thermoplastic material.

The core material of the lightweight shaped articles according to the invention cam-only consist of expanded expandable graphite, or it can also consist of mixtures which are obtained when non-expanded or only partly expanded expandable graphite is heated, together with binders and/or fillers, to temperatures at which the expandable graphite expands.

Possible expandable graphites are, for example, modified graphites which expand when heated to temperatures above 150° C. Such graphites are known and are commercially available. They can contain as blowing agents, for example, incorporated $NO_x$; $SO_x$; $H_2O$; halogens or strong acids. $NO_x$ and $SO_x$ expandable graphites are preferred. Surprisingly, these aggressive blowing gases cause no trouble.

The expandable graphite can be employed, for example, as a flaky or flocked powder, as granules or in the form of pre-shaped pieces. Mixtures of expandable graphites of various forms and/or types are also possible. The expandable graphite can also already be partly expanded before it is employed.

Possible binders which can be employed, if appropriate, as a mixture with the expandable graphite to be expanded are, for example, thermoplastics, such as are described below as the material for the covering layers, as well as ortho-, meta-, pyro- and polyphosphates, phosphonates, borates and silicates which contain metal ions of metals of group 1 to 3 of the periodic table, ammonium or amines as the cationic components, and distillation residues and carbon powder. In the case of phosphates, polyphosphates, phosphonates, borates and silicates having a cationic component based on an amine, possible amines are, for example, ammonia, ethylenediamine, propylenediamine, polyalkylenepolyamines, alkanolamines, aniline, anilineformaldehyde condensates and melamine. The binders are preferably fusible.

Preferred phosphates, polyphosphates, phosphonates, borates and silicates are borax, ammonium phosphate, ammonium polyphosphate, ethylenediamine phosphate, melamine phosphate, melamine borate, melamine diphosphate, melamine polyphosphate, sodium polyphosphate, zinc, calcium, aluminium and magnesium phosphonates and polyphosphates and alkali metal silicates, and in the case of the phosphonates in particular those which a) contain a phosphonate component of the formula (I)

in which

M represents aluminium, magnesium or calcium,

R represents an aliphatic radical having 1 to 6 C atoms or an aromatic radical having 6 to 10 C atoms, R' represents hydrogen, an aliphatic radical having 1 to 6 C atoms or an aromatic radical having 6 to 10 C atoms and x represents an integer corresponding to the valency of M, and 0.05 to 1 mol of an amine from the group comprising ammonia, ethylenediamine, polyethylenepolyamine, melamine, guanidine, urea, dicyandiamide, anilineformaldehyde condensate, ethanolamine and dimethylaminopropylamine is present per equivalent of OR' groupings contained in the phosphonate component, or b) are a metal salt or metalloid salt of a phosphonic acid of the formula ( II )

in which

R represents a straight-chain or branched $C_1$- to $C_3$-alkyl radical which is optionally substituted by halogen and/or OH and R' represents hydrogen or a $C_1$- to $C_3$-alkyl radical, and wherein the metal or metalloid is chosen from groups IIA, IIB, IIIA, IVA and VA of the periodic table, or c) correspond to one of the formulae (III) to (V)

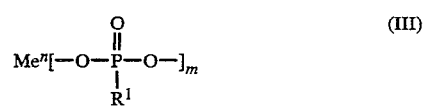

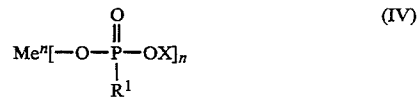

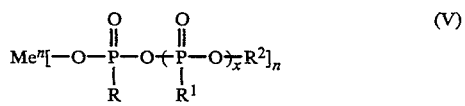

in which, in each case,

Me represents a metal of main or sub-groups 2 or 3 of the periodic table, n represents the valency of the metal Me, m represents n/2, R, R[1] and R[2] in each case independently of one another represent an organic radical having 1 to 18 C atoms, X represents hydrogen, ammonium, alkylammonium or one equivalent of a metal and x represents zero or an integer from 1 to 20.

Phosphates, especially neutral ethylenediamine phosphate and calcium and aluminium salts of polyphosphoric acids, are preferred binders. Where the binders can be distillation residues, examples of possible distillation residues are those such as are obtained during the preparation of aromatic isocyanates or during distillation of tar oil and petroleum. The latter are known by the name "bitumen" and are particularly advantageously employed as a mixture with phosphorus compounds, as is also, for example, mineral coal powder, or powders of other tar-rich coals or plant constituents.

It is also otherwise possible for mixtures of various binders to be employed.

The amount of binders, based on the total weight of the lightweight shaped articles, can be, for example, 0 to 85% by weight. It is preferably 10 to 35% by weight.

Surprisingly, binders containing phosphorus, in particular phosphates and phosphonates of the type mentioned, provide good protection for the core material of lightweight shaped articles according to the invention from oxidative attack by oxygen or air, in particular at temperatures above 500° C. The phosphates are particularly effective here, which is of importance for the lightweight shaped articles to be usable in the high temperature range. The electrical and thermal conductivity are retained here, which is of interest for specific intended uses, for example as heating elements.

If desired, the expandable graphite to be expanded can also be employed in combination with fillers which melt and/or do not melt under the particular production conditions. Such fillers can be, for example, in the form of fibres, beads, hollow beads or powders, and can consist, for example, of glass, quartz, carbon, chalk, asbestos, flyash, talc, calcined or slaked lime, hydrargillite, cement and/or kaolin. 0 to 75% by weight of fillers, for example, preferably 0 to 50% by weight, based on the total weight of the lightweight shaped articles, can be incorporated.

Possible thermoplastic materials of which at least one covering layer of the lightweight shaped articles according to the invention consists, preferably both if two covering layers are present, and which can also be used, if appropriate, as a binder additive to the expandable graphite to be expanded are, for example, organic and/or inorganic materials which soften or melt but do not decompose in an undesirable manner when heated to the production temperatures of lightweight shaped articles according to the invention. These can be very diverse types of materials, depending on what production temperatures are to be chosen. The thermoplastic materials preferably have a glass transition temperature above 150° C.

High production temperatures for lightweight shaped articles according to the invention, for example those above 900° C, can be applied if the thermoplastic materials employed are, for example, rock powders, in particular sintered or molten rock powders, slag, enamel frits, clay minerals, porcelain clays, other ceramic base materials, glasses or correspondingly high-melting metals or metal alloys, for example steel, copper, aluminium and/or silver.

Production temperatures below 1500° C., in particular those between 300° and 900° C., and metals, metal alloys, glasses, glass-ceramic compositions, organic-inorganic or organic-aromatic plastics which soften or melt in this range are preferably used for lightweight shaped articles according to the invention. Possible metals here are, for example, aluminium, lead, zinc and alloys containing these metals, possible glasses are, in particular, silicate glasses, such as soda-lime glasses, borosilicate glasses, alumosilicate glasses and glasses with low expansion coefficients, possible organic-inorganic plastics are, for example, silicones, so-called ormocers (that is to say organically modified ceramic compositions) and phosphacenes, and possible organic-aromatic plastics are, for example, polyesters, polyethers, polyepoxides, polysulphides, polysulphones, polyimides, polyamides, polyanhydrides, polyketones, polycarbonates, polyhydantoins, polyoxazinediones, polyureas, polycarbodiimides, polyurethanes and LC polymers, each of which contains aromatic structures in the polymer chain, and mixtures thereof. Particularly preferred materials are silicate glasses, aluminium, aluminium alloys and polyphenylene sulphide.

Covering layers which soften only at high temperatures and which, if appropriate, are thermoplastically deformable at temperatures higher than the production temperature of the lightweight shaped articles can also be employed in the context of the present invention. Examples of such materials are steel, copper, silver, ceramic compositions and quartz.

In particular at low production temperatures for lightweight moldings according to the invention, e.g. at those below 300° C., polyolefins, for example polypropylene, polyethylene, polybutadiene, polystyrene, polyvinyl acetate, polyacrylate esters or mixtures thereof, are also suitable as thermoplastic materials. However, with these there is sometimes the risk that the polyolefins decompose in an undesirable manner before the expandable graphite employed has expanded sufficiently.

Thermoplastic materials for covering layers of the lightweight shaped articles according to the invention can be employed, for example, in the form of sheets, powders, granules or fibres or as textile sheet-like structures (mats, nonwovens). Sheet goods are preferred. If appropriate, the thermoplastic materials can contain additives, for example fillers, reinforcing fibres, stabilisers and/or dyestuffs.

Thermoplastic materials as a binder additive in the expandable graphite to be expanded are preferably employed in the form of powders, granules or synthetic fibres. In specific cases, the thermoplastic materials can also be used in sheet form here, if this is embedded in the expandable graphite layer.

Sandwich-like lightweight shaped articles according to the invention can be obtained by allowing expandable graphite which is capable of expansion and if appropriate contains a binder to expand at temperatures in the range from 200° to 2000° C. between two covering layers, at least one of which consists of a thermoplastic material.

The thermoplastic material and the material containing expandable graphite which is capable of expansion can be in a form as described above.

Preferred temperatures for the production are those from 300° to 900° C., in particular those from 300° to 600° C.

The following procedure is followed, for example, in a particular embodiment of the production process for lightweight shaped articles according to the invention:

A press with which sheets or other shapes can be produced is used. A flat spacer frame of steel is first laid in the press, the thermoplastic material for one covering layer is then introduced, followed by the material which contains expandable graphite and is capable of expansion, and then, if appropriate, the material for a second covering layer, which, if present, can consist of thermoplastic material or another material. The spacer frame is then not yet filled up, but still leaves room for the expansion of the expandable graphite. For this, the press is heated up to the particular desired temperature, it being ensured that the press is secured in a pressure-resistant manner and is essentially closed but the expansion gases can still escape. The parts of the press which cover the spacer frame (for example steel sheets) are preferably provided with a mould release agent on their surface, for example with paper or talced aluminium foil for relatively low temperatures and with graphite, talc or aluminium oxide powder for relatively high temperatures. When the desired temperature has been reached inside the mould, it is cooled and the resulting lightweight shaped article is then removed from the mould.

It is often advantageous to expand the expandable graphite with the exclusion of oxygen.

The thickness of the covering layer(s) and the density of the core material can be controlled by the amount of materials introduced into the press for these components. The covering layers consisting of thermoplastic material reproduce the surface shape of the press. Thus, for example, lightweight shaped articles provided with embossing or a camber can also be obtained.

The core material of lightweight shaped articles according to the invention in general has a bulk density of less than 0.9 g/cm$^3$. The bulk density is preferably in the range from 0.05 to 0.5 g/cm$^3$. The core material is as a rule Joined firmly to the material of the covering layers, especially if the latter has partly seeped into the core material during production of the lightweight shaped articles.

Lightweight mouldings according to the invention can be produced in a simple manner, for example as sheets, profiles or in other shapes to be achieved by shell-like shaping. Cylindrical shapes in which the Jacket consists of one of the thermoplastic materials described for covering layers and the core consists of expanded expandable graphite and if appropriate additives are also possible. Lightweight mouldings according to the invention withstand high temperatures, have a ductile, non-brittle core and can be further shaped and processed as thermoplastics. Lightweight mouldings according to the invention are in general superior to the known products both in respect of their heat stability and in respect of their low bulk density, especially if tough covering layers of lightweight organic polymers, for example those of polyphenylene sulphide or polyimides, or of aluminium are provided. The core material of lightweight mouldings according to the invention is in general thermally and electrically conductive and, in combination with insulating and metallic covering layers, opens up new possible uses.

The present invention also relates to the use of sandwich-like lightweight shaped articles, the core material of which contains expanded expandable graphite and in which at least one covering layer consists of a thermoplastic material, in the construction of apparatuses and housings which can be used at high temperatures and for high-speed missiles, shock absorbers, rocket engines, turbines, combustion engines, exhaust gas ducts, antennae and thermal, electromagnetic and/or electrical shielding and insulating equipment.

In the following examples, parts and percentages relate to the weight, unless stated otherwise.

EXAMPLES

Example 1

Commercially available $NO_x$ expandable graphite which expands to more than 15 times its volume when heated to 600° C. under normal pressure was mixed with a binder which was prepared by reaction of 1 mol of aluminium hydroxide, 3 mol of dimethyl methylphosphonate and water in an autoclave at 180° C. and was obtained as a clear aqueous solution.

A steel mould consisting of a spacer frame of low-scaling steel which had internal dimensions of 12×12×2.5 cm, lay on a steel sheet and was covered with a steel sheet, the spacer frame and the steel sheets being made of material 8 mm thick, was pressed together by screwing. The mould was talced and assembled horizontally, apart from the steel covering sheet. A 2 mm thick flat sheet of commercially available polyphenylene sulphide was laid in the spacer frame, this sheet was then coated uniformly with 40 g of the mixture consisting of expandable graphite and binder, and finally a second, corresponding sheet of polyphenylene sulphide was placed on top.

After the mould had been closed, it was heated at 420° C. in an oven and then cooled and the sandwich formed was removed from the mould.

It consisted of the two polyphenylene sulphide covering sheets, to which the core material of the expanded expandable graphite mixture was firmly joined. The sandwich had the dimensions of the interior of the mould determined by the spacer frame. The core material had an average density of 0.15 g/cm$^3$. In a shearing test, the covering sheet did not become detached from the core material, but the core material broke up.

Example 2

The procedure was as in Example 1, but a commercially available $SO_x$ expandable graphite with similar expansion properties was used as the expandable graphite. The expandable graphite was employed without a binder and the heating temperature was increased to 620° C.

A sandwich was formed in which the core material had been forced into the covering layer material to the extent that an edge zone of integral character impregnated with the covering layer material was formed. The surface layer consisted of annealed polyphenylene sulphide.

Example 3

The procedure was as in Example 1, but instead of polyphenylene sulphide a pane of window glass 2.5 mm thick was used as the covering layer on both sides and a heating temperature of 850° C. was used. An aluminium foil was employed as the release agent here. In order to avoid stresses, the product was cooled in the course of 18 hours. A dimensionally accurate sandwich, the covering layers of which were free from cracks and firmly joined to the core material, was removed from the mould. Example 4

The procedure was as in Example 3, but instead of the pane of window glass, a layer of the same amount by weight of glass powder was introduced onto the bottom of the mould and a double layer of desized glass silk fabric in a dense linen weave was laid on top as the top covering layer. After removal from the mould, a sandwich with a crack-free glassy surface was obtained. In this case, the penetration of the core material and covering layer was greater than in Example 3.

Example 5

The procedure was as in Example 1, but a powder mixture, predried at 350° C., of 70 parts of aluminium hydroxide and 30 parts of colemanite were introduced into the mould as the bottom layer and as the top layer in a height of in each case 3 mm. In addition to talc, a double layer of packing paper (soda Kraft paper) was employed as the release agent. The heating temperature was 950° C.

After cooling, a sandwich, the bottom covering layer of which consisted of a ceramic sinter layer and the core of which consisted of an expanded expandable graphite mixture having an average bulk density of 0.1 g/cm$^3$, obtained.

Example 6

The procedure was as in Example 1, but a mixture of 80 parts of SO$_x$ expandable graphite and 20 parts of neutral ethylenediamine phosphate was used as the expansion material containing a binder. In addition, polycarbonate sheets (Makrolon ®) were used instead of polyphenylene sulphide sheets. The heating temperature was 350° C. After removal from the mould, a sandwich sheet having polycarbonate covering layers which were firmly joined to the core material was obtained.

Example 7

A 1.5 mm thick layer of NO$_x$ expandable graphite and a binder (mixture as in Example 1) was sprinkled onto a 2 mm thick, circular sheet of apparatus glass and covered by an identical glass plate in a flush manner. This package was heated up to 850° C. in an oven, a 1.5 cm thick sandwich being formed. The sandwich was then pressed to a hemisphere at 900° C. in a press mould using a hemispherical die, the sandwich structure being retained. After cooling slowly, the moulding was removed from the mould.

Example 8

The procedure was analogous to Example 1. However, a mixture of equal parts of a) expandable graphite + binder (mixture as in Example 1) and b) bitumen was introduced between the polyphenylene sulphide covering layers. The heating temperature was 460° C. The resulting sandwich proved to be particularly pressure-resistant.

Example 9

The procedure was as in Example 1, but instead of the polyphenylene sulphide sheets, two sheets of identical dimensions made of commercially available aluminium sheet were used and a heating temperature of 680° C. was applied. A sandwich with aluminium covering layers firmly adhering to the core material was obtained.

Example 10

The procedure was as in Example 1, but a lentiform depression and writing were milled into the inside of the steel covering sheet. After removal from the mould, the lentil and the writing were imaged on the upper side of the sandwich formed, since the thermoplastic material of the covering layer had been forced by the expansion pressure of the core material into the covering sheet provided with the depression and writing.

Example 11

The procedure was as in Example 1, but in each case an aluminium sheet 2 mm thick was used as the top and bottom covering layer and in each case granules of about 3 mm diameter which had been prepared from 70% of NO$_x$ expandable graphite and 30% of the following binders were used:

A) binder as in Example 1,
B) commercially available ammonium polyphosphate (90%) mixed with 10% of cane sugar,
C) secondary ammonium phosphate (90%) mixed with 10% of carboxymethylcellulose,
D) neutralization product of ethylenediamine and orthophosphoric acid (90%) mixed with 10% of soluble starch and
E) no binder, 100% of NO$_x$ expandable graphite.

In each case 30 g of expandable graphite mixture were poured into the mould and were heated at 600° C. for 30 minutes. After cooling, in each case a sandwich with a firmly adhering covering layer which could be pulled off only with destruction of the core material in the case of A) to D) was removed from the mould.

A cuboid of dimensions 2.5×3.0×2.0 cm was cut out of each core material of the sandwich prepared using A) to E) and was introduced into an oven heated at 700° C., with access of air. In all cases, the core material had a specific gravity of about 0.1 g/cm$^3$. The stabilisation towards oxidative attack achieved by the phosphorus compounds in the binder was determined as follows from the weight loss after 2 and 3 hours at 700° C.:

| Sample | % loss after 2 hours | % loss after 3 hours |
| --- | --- | --- |
| A) | 5.5 | 5.5 |
| B) | 16.2 | 16.2 |
| C) | 13.3 | 13.4 |
| D) | 9.9 | 9.9 |
| E) | 55.4 | 70.1 |

The particularly good stabilisation of the core material containing the phosphonate binder from Example 1 (sample A)) is striking here.

Example 12

A steel cylindrical mould consisting of two half-shells having a total volume of 2.7 l and a diameter of 4.5 cm was filled in the horizontal position with 300 g of granules according to Example 11A), after it had first been lined with 100 μm foils.

The foils used were:
A) commercial polyimide foil,
B) polyphenylene sulphide foil,
C) aluminium foil,
D) copper foil and
E) silver foil.

The mould was heated at 600° C. in the horizontal position for 30 minutes and then cooled.

In all cases, a foamed rod firmly laminated with the particular covering layer, the core material of which had a density of about 0.95 g/cm$^3$, had formed.

Such a rod material can be used as a semi-finished product for the production of shielding elements for high-performance electronic components.

Example 13

The procedure was as in Example 12, a Jacket tube of aluminium being used instead of the foil. An impact energy absorption element which is suitable for intercepting axially directed impacts was obtained.

What is claimed is:

1. A lightweight shaped article comprising a core having a top surface and a bottom surface and at least one covering layer on both the top surface of said core and the bottom surface of said core, wherein at least one of said covering layers is consisting of a thermoplastic material, said core having a bulk density of less than 0.9 g/cm$^3$; said core consisting essentially of expanded graphite, a phosphate or phosphonate binder, and optionally a filler; said filler being selected from the group consisting of glass, quartz, carbon, chalk, asbestos, flyash, talc, calcined or slaked lime, hydrargillite, cement, kaolin, and mixtures thereof; said binder being present in an amount of 10% to 85% based on the total weight of the shaped article; said filler being present in an amount of up to 75% based on the total weight of the shaped article.

* * * * *